United States Patent
Newman et al.

(10) Patent No.: US 11,223,529 B1
(45) Date of Patent: Jan. 11, 2022

(54) METHODS FOR INVENTORYING AND SECURING PUBLIC CLOUD DATABASES AND DEVICES THEREOF

(71) Applicant: BLOCWATCH INC., Rochester, NY (US)

(72) Inventors: Aaron Newman, Pittsford, NY (US); Jason Ruckman, Rochester, NY (US); Angus Davis, Rochester, NY (US)

(73) Assignee: BLOCWATCH INC., Rochester, NY (US)

( * ) Notice: Subject to any disclaimer, the term of this patent is extended or adjusted under 35 U.S.C. 154(b) by 0 days.

(21) Appl. No.: 16/995,889

(22) Filed: Aug. 18, 2020

(51) Int. Cl.
*H04L 12/24* (2006.01)
*H04L 29/06* (2006.01)
*H04L 12/931* (2013.01)

(52) U.S. Cl.
CPC ........ *H04L 41/0843* (2013.01); *H04L 49/354* (2013.01); *H04L 63/20* (2013.01); *H04L 67/40* (2013.01)

(58) Field of Classification Search
None
See application file for complete search history.

(56) References Cited

U.S. PATENT DOCUMENTS

2019/0147089 A1* 5/2019 Megahed ............ G06F 16/2477
707/718

* cited by examiner

*Primary Examiner* — Brian Whipple
(74) *Attorney, Agent, or Firm* — Troutman Pepper Hamilton Sanders LLP (Rochester)

(57) ABSTRACT

Methods, non-transitory computer readable media, and infrastructure management devices that inventory, and facilitate improved security of, public cloud databases are illustrated. With this technology, access data for one or more accounts associated with one or more public cloud networks is obtained. This technology then periodically identifies, stores an indication of, and obtains and stores a state of, a plurality of databases hosted by the public cloud networks using the obtained access data and one or more application programming interfaces (APIs) provided by the public cloud networks for each of one or more types of the databases. A dashboard comprising an inventory of the databases for a historical time period is then generated, based on the stored indication and state of each of the databases, and output.

18 Claims, 5 Drawing Sheets

METHODS FOR INVENTORYING AND SECURING PUBLIC CLOUD DATABASES AND DEVICES THEREOF

FIELD

This technology generally relates to database management and security and, more particularly, to methods and devices for inventorying and securing public cloud databases.

BACKGROUND

Historically, a significant amount of information technology (IT) infrastructure has been built and managed in proprietary data centers, requiring individual entities to build and manage physical computers, storage devices, network devices, power sources, server rooms, cooling systems, and even fire suppression systems. Individual IT infrastructure deployment has resulted inefficiencies and fluctuations in the quality, robustness, and security of the various proprietary data centers. Accordingly, entities are increasingly utilizing public cloud infrastructure available from Amazon Web Services™, Microsoft Azure™, and Google Cloud Platform™, for example, which provide unlimited access to compute, network, and storage at a relatively high level of quality, robustness, and security.

Hosts of shared data centers in a public cloud environment provide an application programming interface (API) to turn physical server devices into virtual devices that can be rented, and then unrented, in a matter of seconds. The shared data center infrastructure is geographically dispersed and created as "infinitely" scalable. Accordingly, public cloud providers have taken the complexity of physical security, fire suppression systems, power management, and many other resources and tasks out of the hands of the IT consumers. However, the increased migration of IT infrastructure out of the proprietary data centers and into the emerging public cloud environments requires new IT management strategies, particularly with respect to database security.

Generally, the most sensitive data assets of an entity, such as credit card numbers, social security numbers, personally identifiable information (PII), health information, financial information, customer data, and trade secrets, for example, are stored in a database. In proprietary data centers, most databases are relational databases hosted by monolithic, powerful server devices executing expensive software designed to scale vertically. However, resources in public cloud environments are ephemeral and can be numbered and replaced as needed, which is a relatively robust model, but presents challenges for inventorying, managing, and securing the databases.

In particular, many entities have complex public cloud deployments that include a large number of heterogeneous ephemeral databases spread across a number of accounts on different cloud platforms. With such a diverse and expansive data storage footprint, identifying security concerns, such as may result from insecure parameters at database instantiation, is challenging. Additionally, many current database security tools are installed within different networks than those within which the databases are deployed, and therefore require increased access to the databases, resulting in exposing the databases to additional attack vectors.

SUMMARY

A method for inventorying and securing public cloud databases is implemented by an infrastructure management device and includes obtaining access data for one or more accounts associated with one or more public cloud networks. This technology then periodically identifies, stores an indication of, and obtains and stores a state of, a plurality of databases hosted by the public cloud networks using the obtained access data and one or more application programming interfaces (APIs) provided by the public cloud networks for each of one or more types of the databases. An inventory of the databases for a historical time period is then generated, based on the stored indication and state of each of the databases, and output.

An infrastructure management device is disclosed that includes memory including a first set of one or more programmed instructions stored thereon and one or more processors configured to execute the stored first set of programmed instructions to obtain access data for one or more accounts associated with one or more public cloud networks. This technology then periodically identifies, stores an indication of, and obtains and stores a state of, a plurality of databases hosted by the public cloud networks using the obtained access data and one or more APIs provided by the public cloud networks for each of one or more types of the databases. An inventory of the databases for a historical time period is then generated, based on the stored indication and state of each of the databases, and output.

A non-transitory computer readable medium is disclosed that has stored thereon instructions for inventorying and securing public cloud databases and includes first executable code that, when executed by one or more processors, causes the processors to obtain access data for one or more accounts associated with one or more public cloud networks. This technology then periodically identifies, stores an indication of, and obtains and stores a state of, a plurality of databases hosted by the public cloud networks using the obtained access data and one or more APIs provided by the public cloud networks for each of one or more types of the databases. An inventory of the databases for a historical time period is then generated, based on the stored indication and state of each of the databases, and output.

This technology has a number of associated advantages including methods, non-transitory computer readable media, and infrastructure management devices that advantageously inventory public cloud databases and automatically analyze configuration parameters associated with the inventoried databases for security concerns. Configuration data is advantageously obtained by proxies deployed within virtual private cloud (VPC) networks that also host the inventoried databases to reduce exposure of the databases to security threats. Additionally, this technology provides automated alerting and dashboards that allow administrators to view historical data, including the existence and state at various times of ephemeral databases, along with associated configuration data.

DETAILED DESCRIPTION

Figure 1:
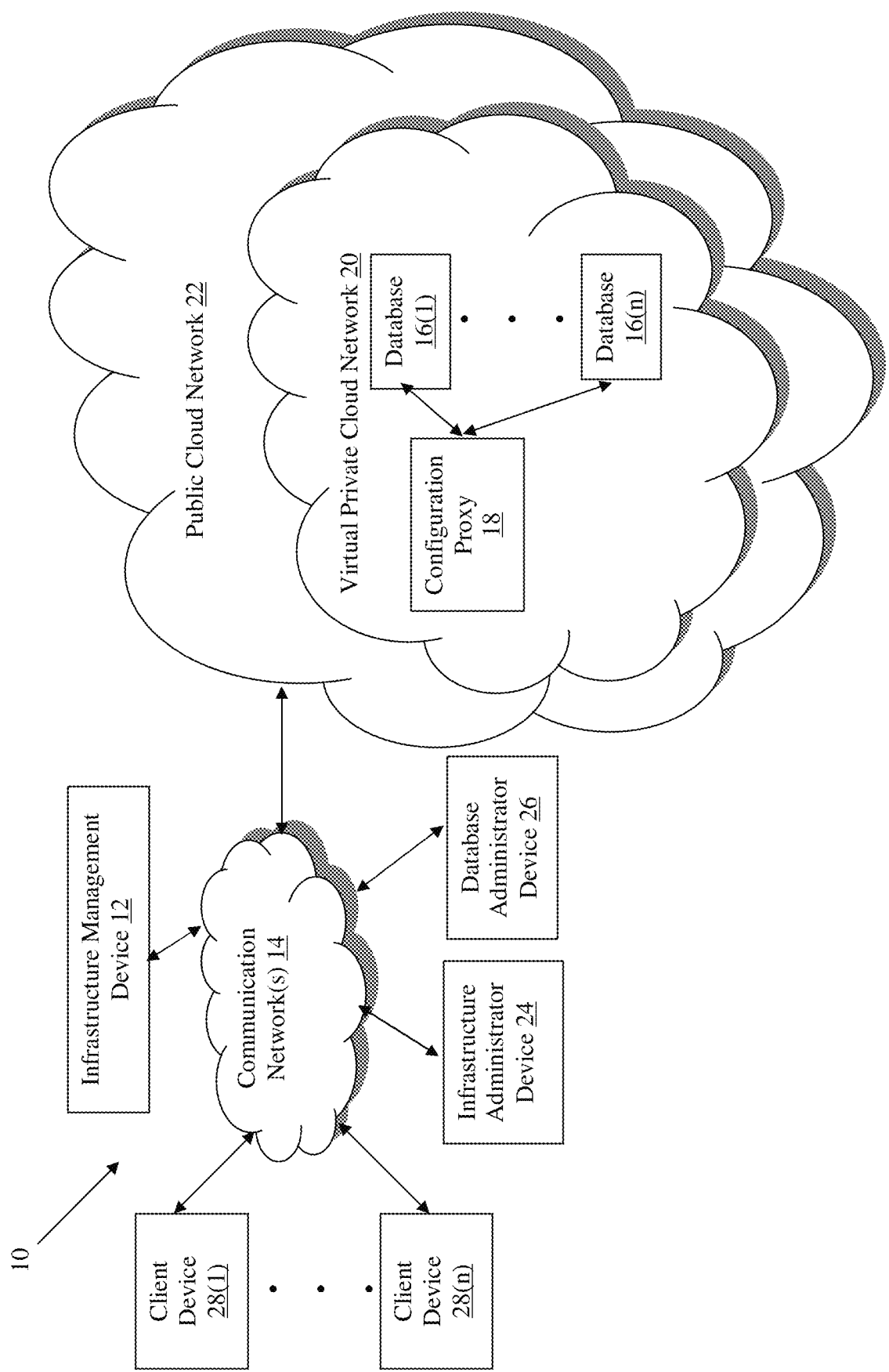
FIG. 1 is a block diagram of an exemplary network system with an infrastructure management device.

Referring to FIG. 1, an exemplary network system 10 is illustrated. The network system 10 in this example includes an infrastructure management device 12 that is coupled, via communication network(s) 14, to databases 16(1)-16(n) via a configuration proxy 18 hosted by a virtual private cloud (VPC) network 20 within a public cloud network 22. The infrastructure management device 12 is also coupled, via the communication network(s) 14, to an infrastructure administrator device 24. The databases 16(1)-16(n) are also coupled to a database administrator device 26 and client devices 28(1)-28(n) via the public cloud network 22 and the communication network(s) 14. The network system 10 also may include other network devices such as routers or switches, for example, which are known in the art and thus will not be described herein. This technology provides a number of advantages including improved inventorying and securing of public cloud databases.

In this example, the infrastructure management device 12 is a dedicated hardware device, but can also be implemented in software within one or more other devices in other examples. For example, the infrastructure management device 12 can be hosted by the infrastructure administrator device 24 or a server device (not shown) in the public cloud network 22, and other network configurations can also be used. Accordingly, the infrastructure management device 12 can be utilized via an application programming interface (API) in a software as a service (SaaS) deployment, and other types of deployments can also be used.

Figure 2:
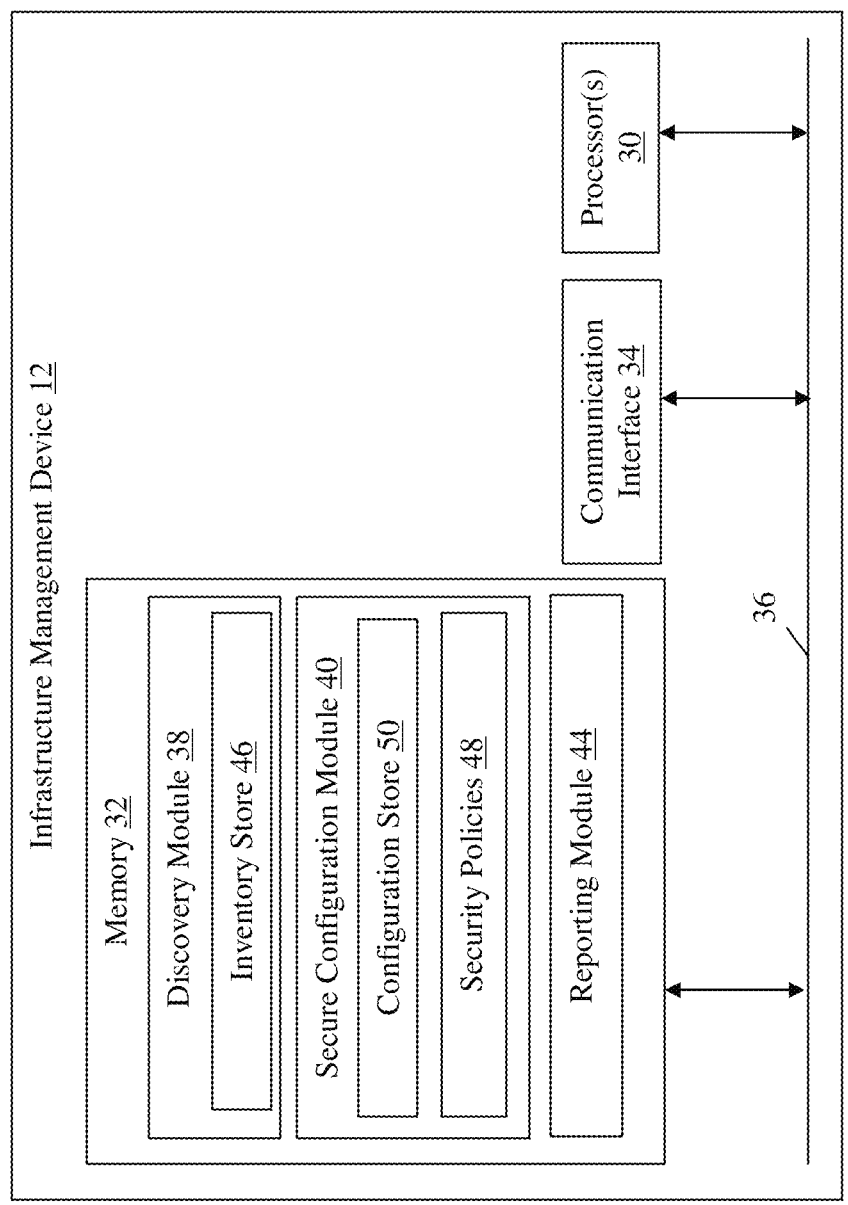
FIG. 2 is a block diagram of an exemplary infrastructure management device.

Referring to FIGS. 1-2, the infrastructure management device 12 in this example includes processor(s) 30, a memory 32, and a communication interface 34, which are coupled together by a bus 36, although the infrastructure management device 12 can include other types or numbers of elements in other configurations. The processor(s) 30 may execute programmed instructions stored in the memory 32 for any number of functions described and illustrated herein. The processor(s) 30 may include one or more central processing units (CPUs) or general purpose processors with one or more processing cores, for example, although other types of processor(s) can also be used.

The memory 32 of the infrastructure management device 12 stores these programmed instructions for aspect(s) of the present technology as described and illustrated herein, although some or all of the programmed instructions could be stored elsewhere. A variety of different types of memory storage devices, such as random access memory (RAM), read only memory (ROM), hard disk, solid state drives (SSD), flash memory, or other computer readable medium which is read from and written to by a magnetic, optical, or other reading and writing system that is coupled to the processor(s) 30, can be used for the memory 32.

Figure 3:
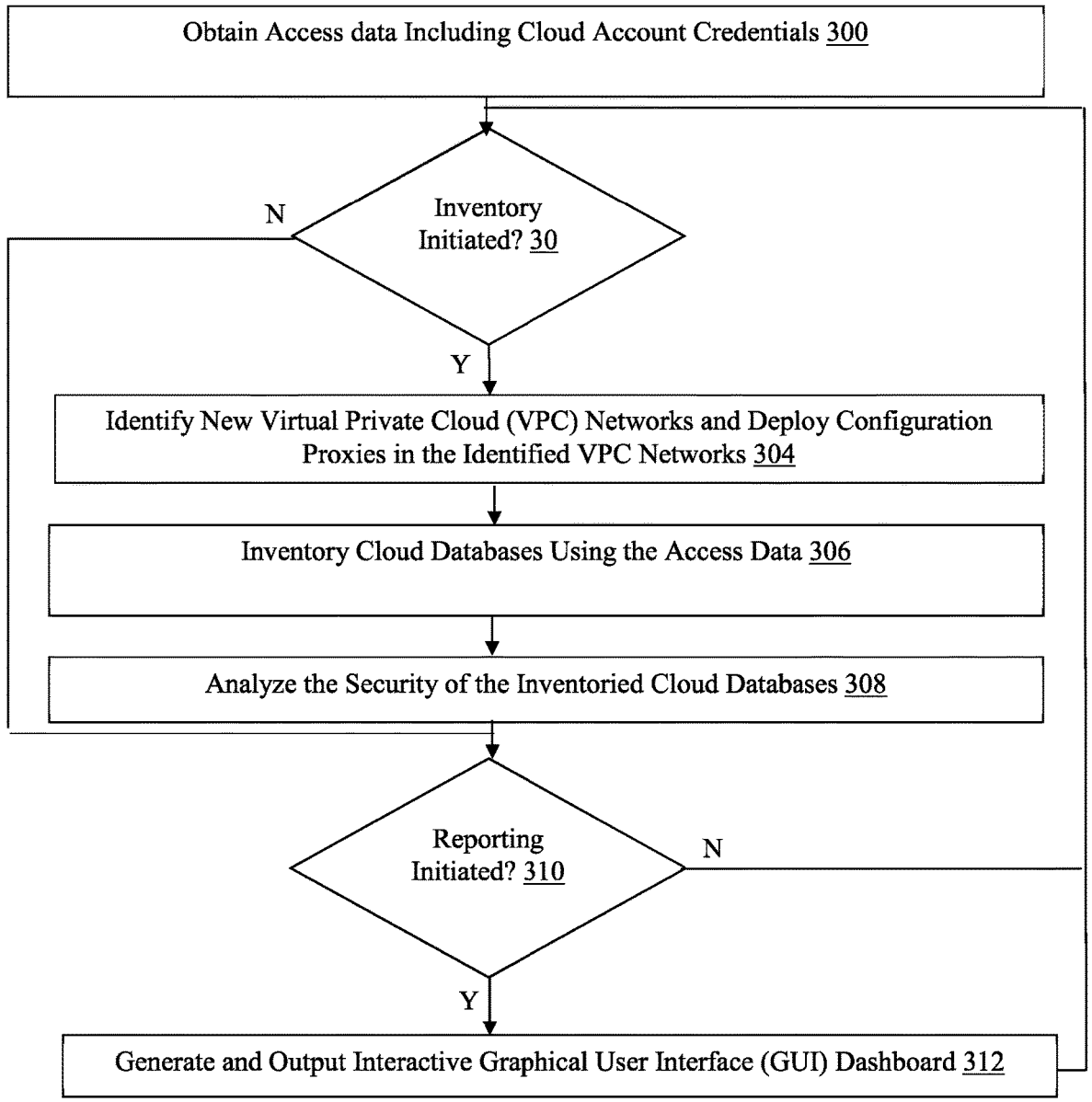
FIG. 3 is a flowchart of an exemplary method for managing public cloud databases.

The memory 32 of the infrastructure management device 12 can store module(s) that can include computer executable instructions that, when executed by the processor(s) 30, cause the processor(s) 30 to perform actions, such as to transmit, receive, and/or otherwise process network messages, for example, and to perform other actions described and illustrated below with reference to FIGS. 3-5. The modules can be implemented as components of other modules, applications, operating system extensions, and/or plugins, for example.

Further, one or more of the modules may be operative in a cloud-based computing environment (e.g., within the public cloud network 22). One or more of the modules can be executed within or as virtual machine(s) or virtual server(s) that may be managed in a cloud-based computing environment. Also, one or more of the modules, and even the infrastructure management device 12 itself, may be located in virtual server(s) running in a cloud-based computing environment rather than being tied to specific physical network computing device(s). Also, one or more of the modules may be running in one or more virtual machines (VMs) executing on the infrastructure management device 12 and managed or supervised by a hypervisor.

In this particular example, the memory 32 includes a discovery module 38, a secure configuration module 40, and a reporting module 44. The discovery module 38 in this example includes an inventory store 46 and is configured to automatically discover databases (e.g., databases 16(1)-16(n)) from one or more public cloud systems (e.g., the public cloud network 22). The discovery module 38 utilizes access data associated with an obtained list of public cloud accounts for an entity and queries each public cloud account using published cloud APIs to retrieve a list of database management systems from each public cloud account.

Accordingly, the discovery module 38 retrieves a complete list of all databases 16(1)-16(n) for an entity by searching for database management systems for any number of database types, each of which generally requires a different API to enumerate. The complete list of databases 16(1)-16(n) is comprehensive with respect to any number of public cloud accounts across any number of public cloud providers or platforms, and is used to store an inventory including an entry with a unique identifier in the inventory store 46 for each of the discovered databases 16(1)-16(n) to thereby provide a holistic view of databases 16(1)-16(n) associated with an entity.

The discovery module 38 can execute periodically or on an ad-hoc basis to maintain a database inventory in a format that can be historically analyzed for existence and security posture. Accordingly, the discovery module 38 effectively creates a map over time of the living inventory of databases 16(1)-16(n) associated with an entity, which can be used to review how the databases 16(1)-16(n) were configured and secured over historical periods of time and to automatically discover one of the databases 16(1)-16(n) when it comes online and assess if it is secured effectively.

To facilitate the historical analysis and security assessment, the discovery module 38 utilizes the public cloud APIs to obtain configuration data for each of the discovered databases 16(1)-16(n). The configuration data can be maintained in the inventory store 46 and can include information regarding a time of creation, modification, and/or deletion to allow an administrator to determine whether one of the databases 16(1)-16(n) existed at a point in time, or over a period of time, and to facilitate reporting regarding quantity and location, for example. The configuration data also includes information regarding security settings and permissions, for example, that can be used by the secure configuration module 40. The operation of the discovery module 38 is described and illustrated in more detail below with reference to FIG. 4.

The secure configuration module 40 applies security policies 48 to the configuration data to generate security result data, which is stored in a configuration store 50. The secure configuration module 40 loads the list of databases 16(1)-16(n) from the inventory store 46 and, for each of the databases 16(1)-16(n), initiates a series of applicable security checks contained within the security policies 48 to review the security settings, user and administrative privileges, and the encryption and network settings, for example, associated with the database. Accordingly, the security policies 48 define which of the security checks are executed against the inventoried databases 16(1)-16(n), and include the parameter(s) to qualify the check(s). The results of the security checks are stored as security result data in the configuration store 50 in a format that facilitates tracking over time the different settings or permissions, including when each setting or permission was created, modified, and/or deleted.

Exemplary security checks defined within the security policies 48 include "weak passwords," "default usernames\passwords," and "publicly-accessible databases," although any number of other security checks can also be used in other examples. In some examples, some of the security checks are specific to a particular database type and other of the security checks are generic to many database types, but may include different implementation logic for one or more database types.

Additionally, the secure configuration module 40 can facilitate generation, and incorporation into one or more of the security policies 48, of custom security checks that can have implementation logic and/or structured query language (SQL) statements that are specific to an environment or security requirements, for example. The security result data can include an indication of the check(s) that failed for one or more of the databases 16(1)-16(n), which can be used for reporting and can then be addressed by administrators to improve database security. The operation of the secure configuration module 40 is described and illustrated in more detail later with reference to FIG. 4.

The reporting module 44 is configured to generate a graphical user interface (GUI) dashboard that allow an administrator using the infrastructure administrator device 24 to view, query, sort, and/or filter contents of the inventory store 46 and/or configuration store 50, for example. The GUI dashboard can provide the quantity, location, and/or security concerns for one or more of the databases 16(1)-16(n), including those historical and ephemeral ones of the databases 16(1)-16(n) that do not exist at the time that the GUI dashboard is generated. The operation of the reporting module 44 is described and illustrated in more detail later with reference to steps 310-312 of FIG. 3, for example.

The communication interface 34 of the infrastructure management device 12 operatively couples and communicates between at least the infrastructure management device 12, configuration proxy 18, and infrastructure administrator device 24, which are coupled together at least in part by the communication network(s) 14 and VPC network 20 hosted by the public cloud network 22, although other types and/or another number of communication networks and/or systems with other types and/or another number of connections and/or configurations to other devices and/or elements can also be used.

By way of example only, one or more of the communication network(s) 14 can include local area network(s) (LAN(s)) or wide area network(s) (WAN(s)) and the public cloud network 22 can include a WAN (e.g., the Internet). The communication network(s) 14 and/or the public cloud network 22 can use TCP/IP over Ethernet and industry-standard protocols, although other types or numbers of protocols or communication networks can be used. The communication network(s) 14 and/or public cloud network 22 in this example can employ any suitable interface mechanisms and network communication technologies including, for example, Ethernet-based Packet Data Networks (PDNs) and the like.

While the infrastructure management device 12 is illustrated in this example as including a single device, the infrastructure management device 12 in other examples can include a plurality of devices each having one or more processors (each processor with one or more processing cores) that implement one or more steps of this technology. Additionally, one or more of the devices that together comprise the infrastructure management device 12 in other examples can be standalone devices or integrated with one or more other devices or apparatuses. Moreover, one or more of the devices of the infrastructure management device 12 in these examples can be in a same or a different communication network.

The configuration proxy 18 of the network system 10 can be hosted by one or more server devices (not shown) within the VPC network 20 of the public cloud network 22, and is configured to communicate with the databases 16(1)-16(n) to obtain configuration data. The configuration data is returned to the infrastructure management device 12 via the communication network(s) 14 and based on relatively limited and/or highly-controlled egress networking rules that allow only small pipe(s) to a secure destination associated with the infrastructure management device 12 (e.g., the secure configuration module 40). Subsequent to receipt, the infrastructure management device 12 stores the configuration data in the configuration store 50.

The configuration proxy 18 in this example is lightweight and deployed by the infrastructure management device 12 within each VPC (e.g., VPC network 20) hosting a database (e.g., databases 16(1)-16(n)). The deployment can be automatically facilitated by the infrastructure management device 12 using cloud templates (e.g., CloudFormation Templates are one example in which the configuration proxy 18 is deployed into the public cloud network 22 is hosted by Amazon Web Services™). The cloud templates contain instructions of how to run within the VPC network 20, create network security groups required to communicate with the infrastructure management device 12 (e.g., the secure configuration module 40), and create instance(s) and/or virtual server(s) to host the configuration proxy 18.

The databases 16(1)-16(n) of the network system 10 may store data in a raw, compressed, encrypted, and/or deduplicated format, and can be hosted by one or more server devices (not shown) within the VPC network 20 of the public cloud network 22. The databases 16(1)-16(n) can be relational databases and/or one or more of the databases 16(1)-16(n) can be another types of database system including a relational database management system (RDBMS), a No-SQL database, an in-memory database, a data warehouses, or any other type of data store.

The databases 16(1)-16(n) can be provisioned and configured by a database administrator using the database administrator device 26 and an API provided by the public cloud network 22, for example. The database administrator device 26 in this example includes processor(s), a memory, and a communication interface, which are coupled together by a bus or other communication link, although other numbers or types of components could be used. The database administrator device 26 may run interface application(s), such as standard web browsers or standalone client application(s) that facilitate use of the API provided by the public cloud network 22. The database administrator device 26 also may include a display device, such as a display screen or touchscreen, and/or an input device, such as a keyboard, for example.

The databases 16(1)-16(n) are used by the client devices 28(1)-28(n) to store and/or retrieve data stored therein. Accordingly, the client devices 28(1)-28(n) can include any type of computing device that can exchange network data, such as mobile, desktop, laptop, or tablet computing devices, virtual machines (including cloud-based computers), application server devices, and the like. Each of the client devices 28(1)-28(n) includes a processor, a memory, and a communication interface, which are coupled together by a bus or other communication link, although other types and/or another number of components could also be used. The client devices 28(1)-28(n) may run interface application(s), such as standard web browser(s) or standalone client application(s) that provide an interface to make requests for, and receive content stored on, the databases 16(1)-16(n). The client devices 28(1)-28(n) may further include a display device, such as a display screen or touchscreen, and/or an input device, such as a keyboard for example.

The infrastructure administrator device 24 of the network system 10 is configured to interface with the infrastructure management device 12 to provide access data (e.g., cloud account credentials), establish one or more of the security policies 48, and/or generate and consume reports regarding the databases 16(1)-16(n). Accordingly, the infrastructure administrator device 24 includes processor(s), a memory, and a communication interface, which are coupled together by a bus or other communication link, although other numbers or types of components could be used. The infrastructure administrator device 24 may run interface application(s), such as standard web browsers or standalone client application(s) that facilitate use of API(s) provided, and access to report generated, by the infrastructure management device 12. The infrastructure administrator device 24 also may include a display device, such as a display screen or touchscreen, and/or an input device, such as a keyboard, for example.

Although the exemplary network system 10 with the infrastructure management device 12, databases 16(1)-16 (n), configuration proxy 18, infrastructure administrator device 24, database administrator device 26, VPC network 20, public cloud network 22, client devices 28(1)-28(n), and communication network(s) 14 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network system 10, such as the infrastructure management device 12, databases 16(1)-16(n), configuration proxy 18, infrastructure administrator device 24, database administrator device 26, or client devices 28(1)-28(n), for example, may be configured to operate as virtual instances on the same physical machine. In other words, one or more of the infrastructure management device 12, databases 16(1)-16 (n), configuration proxy 18, infrastructure administrator device 24, database administrator device 26, or client devices 28(1)-28(n) may operate on the same physical device rather than as separate devices communicating through communication network(s) 14, public cloud network 22 and/or VPC network 20.

Additionally, there may be more or fewer infrastructure management devices, databases, configuration proxies, management administrator devices, database administrator devices, or client devices than illustrated in FIG. 1. In particular, the VPC network 20 can include any number of databases, the public cloud network 22 can include any number of VPC networks each including a set of database(s) having associated configuration proxies and/or monitoring proxies, and any number of public cloud networks associated with other platform hosts or providers can be coupled to the infrastructure management device 12 via the communication network(s) 14. Accordingly, the particular topology illustrated in FIG. 1 is included merely to facilitate the description herein of some exemplary implementations of this technology.

The examples also may be embodied as one or more non-transitory computer readable media, such as the memory 32 of the infrastructure management device 12, having instructions stored thereon for aspect(s) of the present technology, as described and illustrated by way of the examples herein. The instructions in some examples include executable code that, when executed by one or more processors, such as the processor(s) 30 of the infrastructure management device 12 and, cause the processors to carry out steps necessary to implement the methods of the examples of this technology that are described and illustrated herein.

An exemplary method of inventorying and securing public cloud databases will now be described with reference to FIGS. 1-5. Referring more specifically to FIG. 3, an example of a method of managing public cloud databases is illustrated. In step 300 in this example, the infrastructure management device 12 obtains and stores access data for cloud account(s) associated the databases 16(1)-16(n). The access data can include credentials, passwords, access keys, cross-account roles, and/or authentication data, although other types of data capable of facilitating access to the public cloud accounts, and/or other information, can also be included in the access data. In one example, the access data can be obtained from the infrastructure administrator device 24 via a submitted file or a provided user interface, for example.

In step 302, the infrastructure management device 12 determines whether an inventory process has been initiated. An inventory process can be triggered manually or on an ad-hoc basis by a user of the infrastructure administrator device 24, for example, and/or can be configured to occur periodically, for example, and other methods for triggering an inventory process can also be used. If the infrastructure management device 12 determines that an inventory trigger has occurred, then the Yes branch is taken to step 304.

In step 304, the infrastructure management device 12 uses the access data to identify any new VPC network(s) and deploys configuration proxies into the identified new VPC network(s). The identified VPC network(s) are new with respect to prior inventorying of the infrastructure associated with the entity. In this example, the infrastructure management device 12 utilizes the obtained access data to access and query a cloud account associated with the public cloud network 22 using an API provided by a host of the public cloud network 22.

In a first iteration, the infrastructure management device 12 will determine based on the query that the VPC network 20 is new with respect to the associated cloud account. Optionally, the determination can be based on a comparison with identification information for VPC network(s) and/or database(s) maintained in the inventory store 46 as a result of prior infrastructure inventorying, although the determination can be made based on other information in other examples. Upon identifying the new VPC network 20, the infrastructure management device 12 automatically deploys the configuration proxy 18, optionally using cloud template (s), as described and illustrated in more detail above.

In step 306, the infrastructure management device 12 inventories the databases 16(1)-16(n) associated with the entity. The inventoried databases 16(1)-16(n) can be associated with the cloud account(s) for the entity, for which the access data was obtained in step 300, for example.

Figure 4:
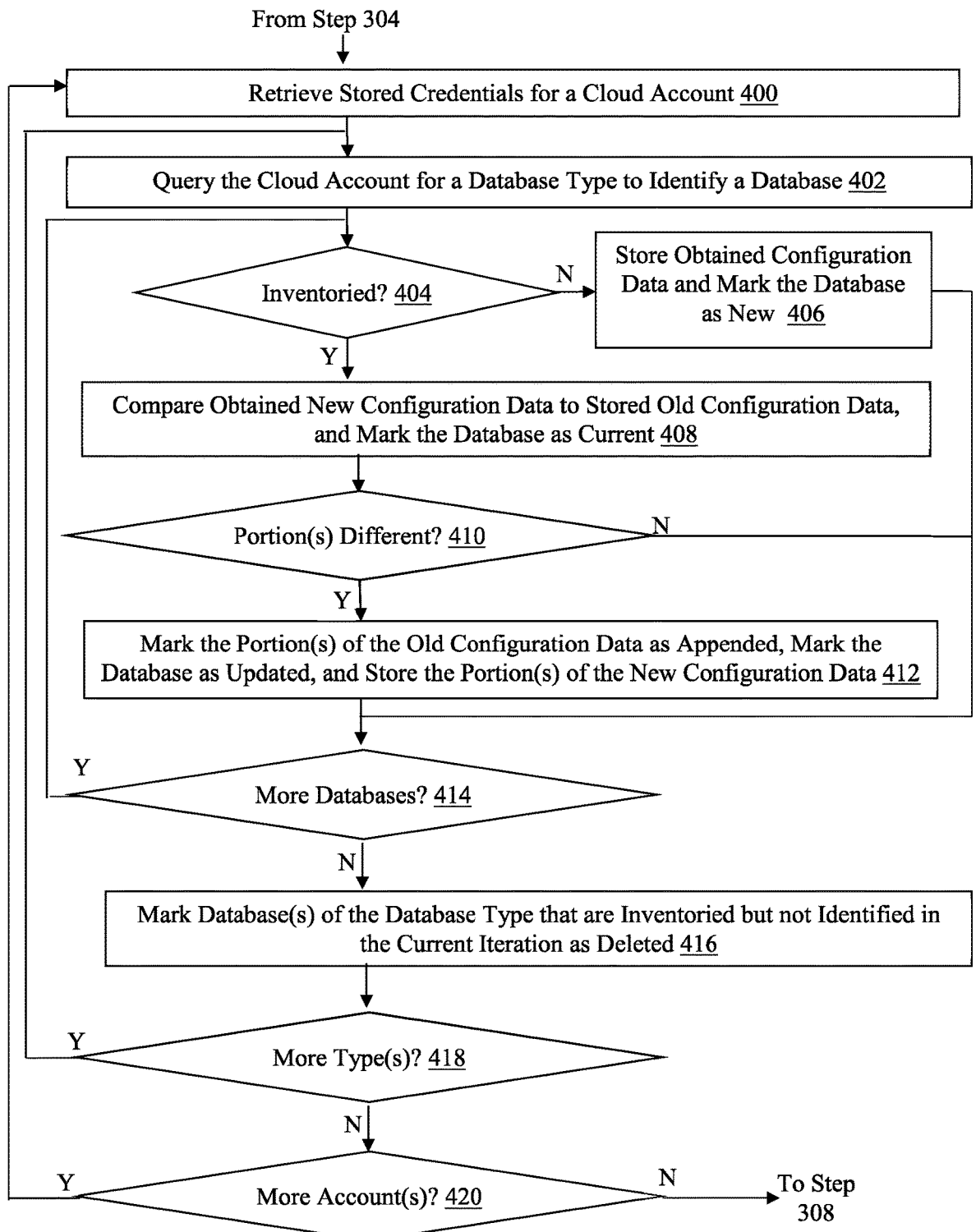
FIG. 4 is a flowchart of an exemplary method for inventorying public cloud databases.

Referring more specifically to FIG. 4, an example of a method of inventorying the public cloud databases 16(1)-16(n) is illustrated. In step 400 in this example, the infrastructure management device 12 retrieves stored access data for a cloud account associated with an entity. The access data could have been obtained and stored as described and illustrated in more detail earlier with reference to step 300 of FIG. 3, for example.

In step 402, the infrastructure management device 12 queries the cloud account for which the access data was retrieved in step 400 for a particular database type in order to identify one of the databases 16(1)-16(n). The database type can be a relational database, No-SQL database, or any other type of database capable of being hosted by the public cloud network 22. In some examples, each of the database types has a different exposed API that can be utilized by the infrastructure management device 12 in the inventory process to identify, and/or obtain particular configuration data for, the database(s) of the database type, for example. Accordingly, the query can be made using an API exposed by a provider of the public cloud network 22 for the database type, and the identified one of the databases 16(1)-16(n) can be of the database type.

In step 404, the infrastructure management device 12 determines whether the one of the databases 16(1)-16(n) identified in step 402 is already inventoried in the inventory store 46 based on match of a unique identifier for the one of the databases 16(1)-16(n), for example, or any other unique characteristic. If the infrastructure management device 12 determines that the identified one of the databases 16(1)-16(n) was not previously inventoried, then the No branch is taken to step 408.

In step 406, the infrastructure management device 12 obtains and stores in the inventory store 46 configuration data and marks the identified one of the databases 16(1)-16(n) as new. The configuration data can include a time of creation or modification(s) and/or information regarding security settings and permissions, for example, although other types of configuration data can also be obtained. One or more portions of the configuration data can be obtained initially by the configuration proxy 18 in the VPC network 20 and returned securely to the infrastructure management device 12 upon request, although other methods for obtaining the configuration data for the one of the databases 16(1)-16(n) can also be used.

Upon obtaining the configuration data, the infrastructure management device 12 can insert a new entry into the inventory store 46, which includes a unique identifier for the one of the databases 16(1)-16(n), the obtained configuration data, and an indication that the one of the databases 16(1)-16(n) is new with respect to the current iteration. However, if the infrastructure management device 12 determines in step 406 that the identified one of the databases 16(1)-16(n) was previously inventoried, then the Yes branch is taken to step 410.

In step 408, the infrastructure management device 12 obtains a new set of configuration data for the one of the databases 16(1)-16(n) and compares portions of the new configuration data to corresponding portions of old configuration data stored in the inventory store 46. In this example, the old configuration data is the configuration data that is most recent with respect to any portion of the configuration data. If the entry in the inventory store 46 for the one of the databases 16(1)-16(n) is marked as new or updated, then infrastructure management device 12 modifies the entry to replace the marking with an indication that the one of the databases 16(1)-16(n) is current.

In step 410, the infrastructure management device 12 determines whether any portions of the configuration data has changed based on the comparison in step 408. For example, a security setting or permission may have changed subsequent to the previous iteration. If the infrastructure management device 12 determines that at least one portion of the new configuration data is different than the old configuration data, then the Yes branch is taken to step 412.

In step 412, the infrastructure management device 12 marks, in the entry of the inventory store for the one of the databases 16(1)-16(n), portion(s) of the old configuration data as appended and the one of the databases 16(1)-16(n) as updated, optionally with timestamp(s). Additionally, the infrastructure management device 12 stores portion(s) of the new configuration data obtained in step 408 that are determined in step 410 to be different than corresponding portion(s) of the old configuration data stored in the inventory store 46 based on the comparison in step 408. Subsequent to step 412, step 406, or if the infrastructure management device 12 determines in step 410 that no portion of the new configuration data is different than the old configuration data and the No branch is taken, then the infrastructure management device 12 proceeds to step 414.

In step 414, the infrastructure management device 12 determines whether there are more database(s) of the database type queried in step 402 and for the cloud account for which the access data was retrieved in step 400. The determination in step 414 can be based on the results of the query in step 402 or a subsequent query to the cloud account for the database type, for example, although other methods for determining whether there are more database(s) of the database type can also be used. If the infrastructure management device 12 determines that there is at least one more database of the database type for the cloud account, then the Yes branch is taken back to step 404, and steps 404-414 are repeated in a subsequent iteration. However, if the infrastructure management device 12 determines that there are no more databases of the database type for the cloud account, then the No branch is taken to step 416.

In step 416, the infrastructure management device 12 identifies any databases for which there is an entry in the inventory store 46 but that have not been identified as current in existence in the current iteration. If databases(s) were previously inventoried but not identified in the current iteration, then the databases(s) were deleted subsequent to the prior iteration and the infrastructure management device 12 therefore marks database(s) as deleted, optionally with a timestamp, in the corresponding entries in the inventory store 46.

In step 418, the infrastructure management device 12 determines whether there are more database type(s) to be queried for the cloud account or which credentials were retrieved in step 400. If the infrastructure management device 12 determines that there is at least one more database type for the cloud account, then the Yes branch is taken back to step 402, and steps 402-418 are repeated in a subsequent iteration. However, if the infrastructure management device 12 determines that there are no more database types for the cloud account, then the No branch is taken to step 420.

In step 420, the infrastructure management device 12 determines whether there is/are more cloud account(s) associated with the entity, such as based on the stored access data for the entity, for example. If the infrastructure management device 12 determines that there is at least one more cloud account for the entity, then the Yes branch is taken back to step 400, stored access data for an additional cloud account is retrieved, and steps 400-420 are repeated in a subsequent iteration. However, if the infrastructure management device 12 determines that there are no more cloud accounts, then the No branch is taken to step 308 of FIG. 3.

Referring back to FIG. 3, in step 308, the infrastructure management device 12 analyzes the security of the inventoried databases 16(1)-16(n). While the security is analyzed upon completion of the inventorying in the example of this technology described and illustrated with reference to FIG. 3, in other examples, the security can be analyzed asynchronously, on an ad-hoc basis, and/or at other times. The security can be analyzed with respect to public accessibility, permissions, and/or settings, for example, as will now be described and illustrated in more detail.

Figure 5:
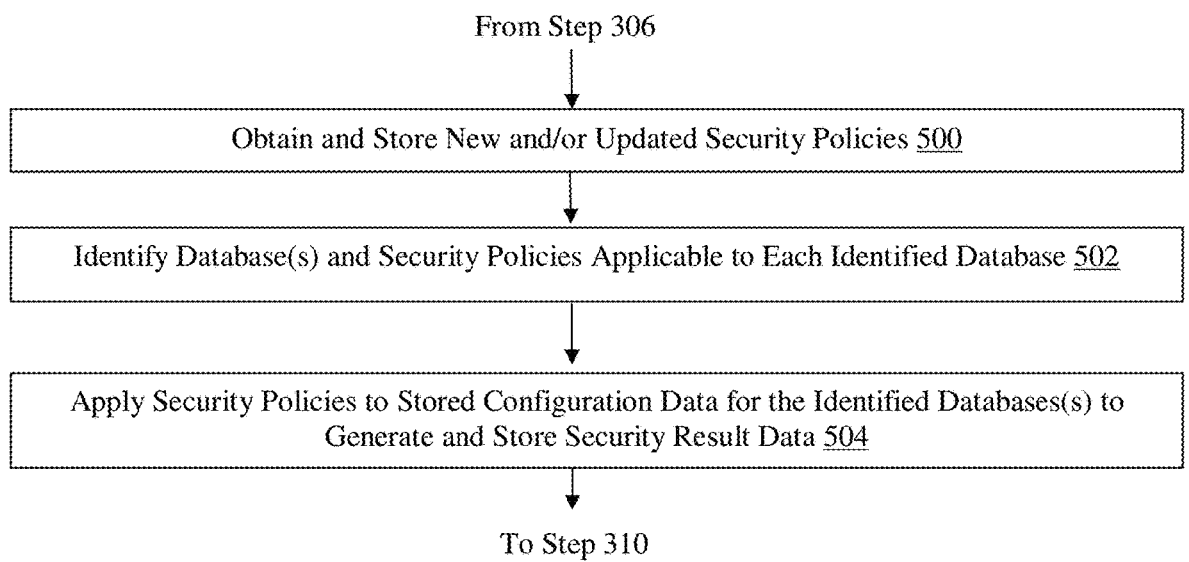
FIG. 5 is a flowchart of an exemplary method for securing public cloud databases.

Referring more specifically to FIG. 5, an example of a method of securing public cloud databases is illustrated. In step 500 in this example, the infrastructure management device 12 obtains and stores in the memory 32 new and/or updated security policies, although new and/or updated security policies can also be updated at other times separate from, and subsequent and/or prior to, initiation of a security analysis. The security policies 48 can be obtained via an interface provided to the infrastructure administrator device 24, for example, although the one or more of the security policies 48 can also be obtained in other ways. The security policies 48 each include one or more security checks having one or more associated rules and one or more of the security policies 48 can be custom, generic, and/or applicable only to a particular subset of the databases 16(1)-16(n) (e.g., one or more particular database type(s)), as described in more detail above.

In step 502, the infrastructure management device 12 identifies those of the database(s) 16(1)-16(n) to which the security policies 48 are to be applied. If none of the security policies 48 is new, then the security policies 48 do not need to be applied to those of the databases 16(1)-16(n) marked in the inventory store 46 as being current. In other words, absent new ones of the security policies 48, only those of the databases 16(1)-16(n) marked in the inventory store 46 as new or updated may be identified in step 502, but all of the databases 16(1)-16(n) may need to be identified if at least one new one of the security policies 48 is obtained in step 502. Other methods for identifying those of the databases(s) 16(1)-16(n) for which the associated security should be analyzed in a current iteration can also be used in other examples.

In step 504, the infrastructure management device 12 applies the security policies 48 to stored configuration data for those of the databases 16(1)-16(n) identified in step 502 to generate and store in the configuration store 50 security result data. The security result data in this example includes an indication of one or more security checks of the applied security policies 48 that failed for one or more of the identified databases 16(1)-16(n).

Optionally, failure of any particular one or more security checks can cause the infrastructure management device 12 to generate an alert message and/or the failure of the check(s) can be output as described and illustrated in more detail later. As explained earlier, failure of a check can indicate a relatively weak password or that one of the databases 16(1)-16(n) is publicly accessible but should not be, and any other type of vulnerability for one or more of the databases 16(1)-16(n) can also be analyzed and defined by one of the security checks of the security policies 48. Subsequent to applying the security policies 48 and storing the generated security result data, the infrastructure management device 12 proceeds to step 310 of FIG. 3 in this example.

Referring back to FIG. 3, in step 310, the infrastructure management device 12 determines whether reporting of the inventory, state, and/or security posture of the databases 16(1)-16(n), for example, has been initiated, such as by a user of the infrastructure administrator device 24 via a provided interface or based on an automated and/or periodic trigger, for example, although other methods of initiating a reporting can also be used in other examples. If the infrastructure management device 12 determines that reporting has been initiated, then the Yes branch is taken to step 312.

In step 312, the infrastructure management device 12 generates and outputs an interactive GUI dashboard based on the stored configuration and security result data for the databases 16(1)-16(n). The GUI dashboard can facilitate searching, sorting, querying, filtering, and any other interaction with the configuration and/or security result data to allow an administrator of the infrastructure associated with the databases 16(1)-16(n) to obtain a holistic current and/or historical view of the databases 16(1)-16(n), or a subset thereof existing at any particular point in time, and their associated configuration and/or security result data. Optionally, the GUI dashboard can highlight or otherwise identify any of the databases 16(1)-16(n) for which the corresponding security result data indicates a failure of one or more of the security checks of one or more of the security policies 48 to allow an administrator to quickly identify vulnerabilities that may need to be addresses in order to improve the security of the infrastructure.

In other examples, other types of information can be included on the GUI dashboard. Additionally, other types of reports can be generated according to any criteria preconfigured or provided by the infrastructure administrator device 24 in this example. Subsequent to outputting the GUI dashboard in step 312, or if the infrastructure management device 12 determines in step 310 that a reporting has not been currently initiated and the No branch is taken, then the infrastructure management device 12 proceeds back to step 302 and identifies new VPC networks in a subsequent iteration. In other examples, the infrastructure management device 12 can proceeds back to step 300 and obtain new or updated access data for one or more public cloud accounts prior to proceeding to identify new VPC networks. In yet other examples, one or more of steps 300-312 can be performed in a different order and/or in parallel.

With this technology, public cloud databases can be inventoried and analyzed for security concerns across cloud providers and database types. This technology advantageously utilizes proxies deployed within VPC networks to obtain configuration data and reduce the exposure of the inventoried and monitored databases. Additionally, this technology facilitate more efficient discovery and management of databases, and provides administrators with a holistic and historical view of the storage infrastructure for an entity as well as the ability to address vulnerabilities.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for inventorying and securing public cloud databases implemented by an infrastructure management device, the method comprising:
   obtaining access data for one or more accounts associated with one or more public cloud networks;
   periodically identifying, storing an indication of, and obtaining and storing a state of, a plurality of databases hosted by the public cloud networks using the obtained access data and one or more application programming interfaces (APIs) provided by the public cloud networks for each of one or more types of the databases; and
   generating based on the stored indication and state of each of the databases, and outputting, an inventory of the databases for a historical time period.

2. The method of claim 1, wherein the inventory comprises at least an indication of each of the databases and the state of each of the databases at one or more points in the historical time period, wherein the state comprises created, deleted, or modified.

3. The method of claim 1, further comprising periodically obtaining and storing configuration data for each of the databases using the obtained access data and one or more configuration proxies deployed into each of a plurality of virtual private cloud (VPC) networks hosted by the public cloud networks.

4. The method of claim 3, further comprising executing at least one cloud template to create one of the configuration proxies within one of the VPC networks, at least one security group, and one or more additional configurations required for execution the one of the configuration proxies.

5. The method of claim 3, further comprising:
   applying at least one obtained security policy to the stored configuration data to generate security data for each of the databases, wherein the security policy comprises one or more security checks; and
   outputting a dashboard comprising an indication of a failure of one or more of the security checks for one or more of the databases.

6. The method of claim 5, wherein at least a subset of the security checks are specific to one or more of the types of the databases and configured to analyze user or administrator permissions or security, encryption, or network settings within the stored configuration data.

7. An infrastructure management device, comprising memory comprising a first set of one or more programmed instructions stored thereon and one or more processors configured to execute the stored first set of programmed instructions to:
   obtain access data for one or more accounts associated with one or more public cloud networks;
   periodically identify, store an indication of, and obtain and store a state of, a plurality of databases hosted by the public cloud networks using the obtained access data and one or more application programming interfaces (APIs) provided by the public cloud networks for each of one or more types of the databases; and
   generate based on the stored indication and state of each of the databases, and output, a dashboard comprising an inventory of the databases for a historical time period.

8. The infrastructure management device of claim 7, wherein the inventory comprises at least an indication of each of the databases and the state of each of the databases at one or more points in the historical time period, wherein the state comprises created, deleted, or modified.

9. The infrastructure management device of claim 7, wherein the processors are further configured to execute a second set of one or more programmed instructions stored in the memory to periodically obtain and store configuration data for each of the databases using the obtained access data and one or more configuration proxies deployed into each of a plurality of virtual private cloud (VPC) networks hosted by the public cloud networks.

10. The infrastructure management device of claim 9, wherein the processors are further configured to execute a third set of one or more programmed instructions stored in the memory to execute at least one cloud template to create one of the configuration proxies within one of the VPC networks, at least one security group, and one or more additional configurations required for execution the one of the configuration proxies.

11. The infrastructure management device of claim 9, wherein the processors are further configured to execute a third set of one or more programmed instructions stored in the memory to:
   apply at least one obtained security policy to the stored configuration data to generate security data for each of the databases, wherein the security policy comprises one or more security checks; and
   output a dashboard comprising an indication of a failure of one or more of the security checks for one or more of the databases.

12. The infrastructure management device of claim 11, wherein at least a subset of the security checks are specific to one or more of the types of the databases and configured to analyze user or administrator permissions or security, encryption, or network settings within the stored configuration data.

13. A non-transitory computer readable medium having stored thereon instructions for inventorying and securing public cloud databases comprising first executable code that, when executed by one or more processors, causes the processors to:
   obtain access data for one or more accounts associated with one or more public cloud networks;
   periodically identify, store an indication of, and obtain and store a state of, a plurality of databases hosted by the public cloud networks using the obtained access data and one or more application programming interfaces (APIs) provided by the public cloud networks for each of one or more types of the databases; and
   generate based on the stored indication and state of each of the databases, and output, a dashboard comprising an inventory of the databases for a historical time period.

14. The non-transitory computer readable medium of claim 13, wherein the inventory comprises at least an indication of each of the databases and the state of each of the databases at one or more points in the historical time period, wherein the state comprises created, deleted, or modified.

15. The non-transitory computer readable medium of claim 13, further having stored thereon second executable code that, when executed by the processors, causes the processors to periodically obtain and store configuration data for each of the databases using the obtained access data and one or more configuration proxies deployed into each of a plurality of virtual private cloud (VPC) networks hosted by the public cloud networks.

16. The non-transitory computer readable medium of claim 15, further having stored thereon third executable code that, when executed by the processors, causes the processors to execute at least one cloud template to create one of the configuration proxies within one of the VPC networks, at least one security group, and one or more additional configurations required for execution the one of the configuration proxies.

17. The non-transitory computer readable medium of claim 15, further having stored thereon third executable code that, when executed by the processors, causes the processors to:
- apply at least one obtained security policy to the stored configuration data to generate security data for each of the databases, wherein the security policy comprises one or more security checks; and
- output a dashboard comprising an indication of a failure of one or more of the security checks for one or more of the databases.

18. The non-transitory computer readable medium of claim 17, wherein at least a subset of the security checks are specific to one or more of the types of the databases and configured to analyze user or administrator permissions or security, encryption, or network settings within the stored configuration data.

\* \* \* \* \*

UNITED STATES PATENT AND TRADEMARK OFFICE
CERTIFICATE OF CORRECTION

| | | |
|---|---|---|
| PATENT NO. | : 11,223,529 B1 | Page 1 of 1 |
| APPLICATION NO. | : 16/995889 | |
| DATED | : January 11, 2022 | |
| INVENTOR(S) | : Aaron Newman et al. | |

It is certified that error appears in the above-identified patent and that said Letters Patent is hereby corrected as shown below:

On the Title Page

Item (71), delete "BLOCKWATCH INC., Rochester, NY" and insert -- CLOUD STORAGE SECURITY, Pittsford, NY --

Signed and Sealed this
Fourteenth Day of November, 2023

Katherine Kelly Vidal
*Director of the United States Patent and Trademark Office*